United States Patent [19]

Sato et al.

[11] 4,421,403
[45] Dec. 20, 1983

[54] ORIGINAL IMAGE PROJECTING APPARATUS

[75] Inventors: Tadashi Sato, Kokubunji; Haruo Tsunoi, Kawasaki; Hirotoshi Kishi, Tokyo, all of Japan

[73] Assignee: Canon Kabushiki Kaisha, Tokyo, Japan

[21] Appl. No.: 351,992

[22] Filed: Feb. 24, 1982

Related U.S. Application Data

[63] Continuation of Ser. No. 152,735, May 23, 1980, abandoned.

[30] Foreign Application Priority Data

| May 29, 1979 | [JP] | Japan | 54-66658 |
| May 29, 1979 | [JP] | Japan | 54-66659 |
| May 29, 1979 | [JP] | Japan | 54-66660 |
| May 29, 1979 | [JP] | Japan | 54-66662 |

[51] Int. Cl.³ .................................... G03G 15/04
[52] U.S. Cl. .................................. 355/8; 355/11; 355/66
[58] Field of Search ............... 355/8, 11, 66, 65, 49, 355/75, 60, 57, 51

[56] References Cited

U.S. PATENT DOCUMENTS

| 3,642,366 | 2/1972 | Kawakubo | 355/8 |
| 3,891,315 | 6/1975 | Kolibas | 355/75 X |
| 4,113,373 | 9/1978 | Eppe et al. | 355/8 |
| 4,232,960 | 11/1980 | Glab | 355/8 |

Primary Examiner—Richard L. Moses
Attorney, Agent, or Firm—Fitzpatrick, Cella, Harper & Scinto

[57] ABSTRACT

An optical apparatus for scanning an original in a copying machine or the like is disclosed. In the apparatus, a scanning mirror for scanning the original and a stationary mirror for reflecting an image of the original from the scanning mirror in a direction nearly normal to the scanned surface constitute a first optical path. The stationary mirror and a lens for receiving the reflected light from the stationary mirror and focusing the original image on a photosensitive element constitute a second optical path. During scanning of the original by the scanning mirror, the distance between the scanning mirror and the lens and the distance between the lens and the photosensitive element are kept constant.

14 Claims, 14 Drawing Figures

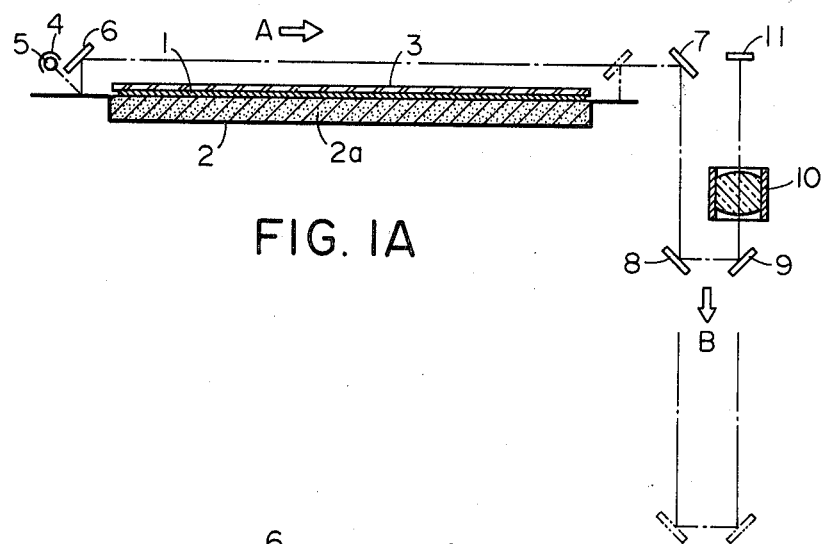
FIG. IA
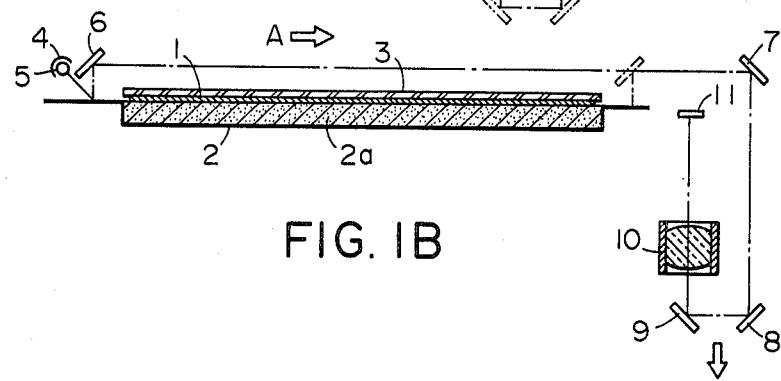
FIG. IB
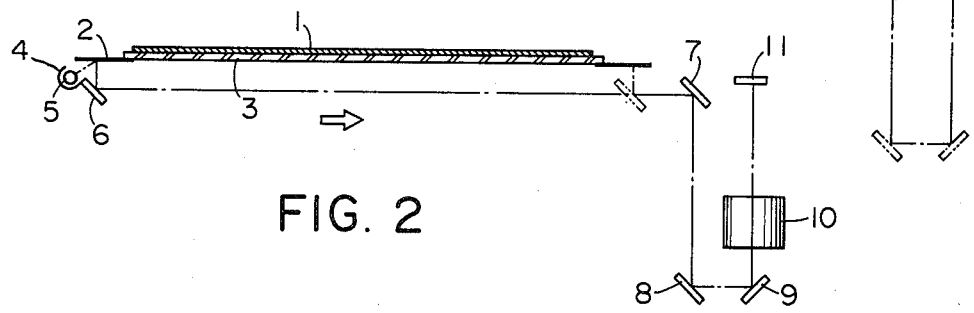
FIG. 2
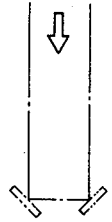

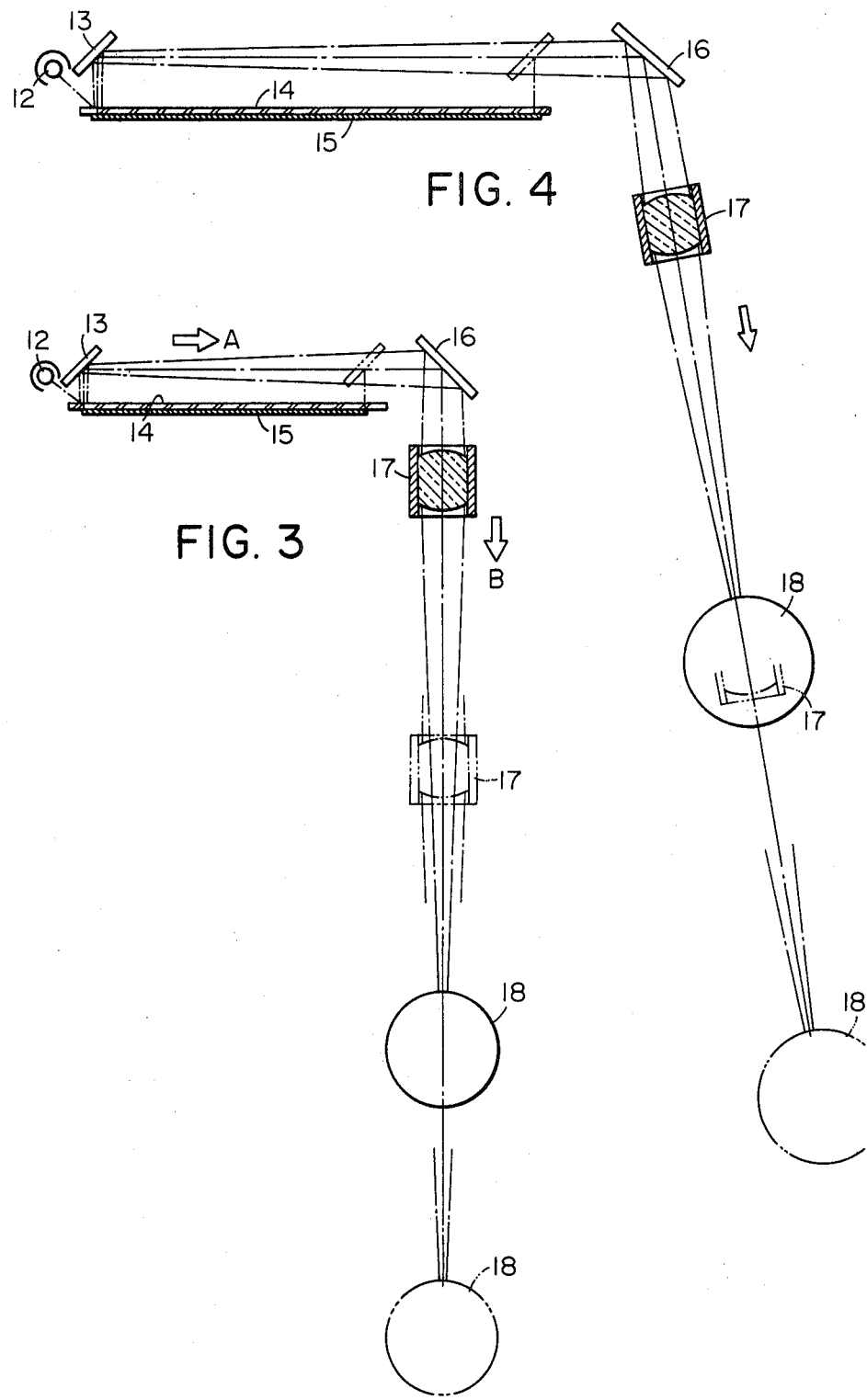

ORIGINAL IMAGE PROJECTING APPARATUS

This is a continuation of application Ser. No. 152,735, filed May 23, 1980, now abandoned.

BACKGROUND OF THE INVENTION

1. Field of the Invention

The present invention relates to an optical scanning apparatus for scanning an original. The optical scanning apparatus is used, for example, to read an original in a copying machine or the like and to project the read image onto a photo-electric element (CCD element) or a conventional electrophotographic photosensitive medium.

2. Description of the Prior Art

Typical examples of such optical systems for scanning a stationary original are disclosed in Japanese Patent Application Publication No. 6,649/1964 (two mirrors are moved at the speed ratio of 2:1) and Japanese Patent Application Publication No. 10,912/1961 (lens is moved at a speed of ½ of the scanning speed).

The optical system disclosed in the former publication has such disadvantage that since the optical path is necessarily disposed under the scanning unit for scanning the original, almost all the space under the original table is occupied by the optical path forming part. An important disadvantage of the optical system disclosed in the latter is found in that a relatively narrow limitation is put on the location of mirror of the optical system. Moreover, the system becomes bulky because of the large size of the mirror which in turn limits the mechanical arrangement of the apparatus and causes a technical inconvenience.

SUMMARY OF THE INVENTION

Accordingly, it is a general object of the invention to provide an optical scanning apparatus which eliminates the above disadvantages.

It is a more specific object of the invention to provide an optical scanning apparatus to enable arrangement of a minimum number of optical means around the original table so that the spaces above and under and around the original table can be used more effectively.

It is another object of the invention to provide an optical scanning apparatus in which the scanning optical system for originals includes a minimum number of optical means and is disposed above the original which is placed on the original table with the image surface side of the original upward thereby allowing an easier handling of the original.

To attain the above objects according to the invention there is provided an optical scanning apparatus comprising original supporting means on which an original is nearly horizontally placed, means for illuminating the original, a scanning mirror for carrying out scanning along the original surface, stationary reflecting means for reflecting the original image scanned by the scanning mirror in a direction nearly normal to the scanned surface, a photosensitive element disposed to receive the original image and condensing means disposed between said stationary reflecting means and photosensitive element to focus the original image on the photosensitive element. When the optical path between the scanning mirror and stationary reflecting means is regarded as a first optical path and that between said stationary reflecting means and photosensitive element as a second optical path, the distance between the scanning mirror and condensing means and the distance between said condensing means and photosensitive element are kept constant respectively during the scanning of an original by the scanning mirror in respect to the optical path of the original image in said first and second optical paths.

According to one embodiment of the invention, the respective distances described above are kept constant by moving said condensing means and photosensitive element at the same time in link with the movement of the scanning mirror provided that said condensing means and photosensitive element are set at a constant distance. According to another embodiment, the distance is kept constant by providing an additional reflecting means such as a moving mirror or moving prism between said stationary reflecting means and condensing means and moving said additional movable means in link with the movement of the scanning mirror provided that said condensing means and photosensitive element are set at a constant distance and fixed at the positions.

Said condensing means is usually a lens and said stationary or moving reflecting means is usually a mirror or prism. As the photosensitive element, a CCD (Charge Coupled Device) element or a photosensitive medium conventionally used in a copying machine employing the known electrophotographic process may be considered.

The arrangement of the optical scanning apparatus according to the invention has various advantages over the prior art ones.

Members to be arranged facing the surface of original are only a scanning mirror and a light source for illuminating the original. This makes it possible to carry out scanning of the scanning mirror above the original. Namely, the original may be placed on an original table with the image information containing surface side of the original upward and the scanning mirror may be run above the original surface.

The second optical path extending to the photosensitive element for receiving the original image is disposed nearly normal to the scanned surface while using a mirror, that is, stationary reflecting means. Therefore, the second optical path never constitutes an obstacle against the opening and closing of the original cover including the scanning mirror.

In the known apparatus according to the prior art, an original has to be placed with its image surface side downward. Therefore, it was difficult to give an indication of the position in which the original should be placed on the original table, to avoid addition to the original or deletion from the original. In contrast, the apparatus according to the invention allows an original to be placed with its image side upward. Therefore, the operator can place the original on the original table and then carry out copying while always viewing the image surface of the original. Checking of instruction as to addition to or deletion from the original can be made easily during copying which makes it easy to edit the finished copies.

Also, when a large number of originals are copied successively, an original to be copied next can be laid on an original just copied. In this simple manner, a large number of originals can be overlaid successively which is very convenient to the operator. When a book original or other bulky original has to be copied, copying of the next page can be started at once after the copied previous page is turned over.

When such embodiment of the invention is employed in which an original is placed with its image side downward and the scanning mirror is driven running under the original, only the scanning area for the scanning mirror is required to be provided under the original. Therefore, under the original table there remains a large space which can be used at one's will. For example, making use of this space available under the original table, one can design a desk type original table which provides an image forming apparatus with which the operator can work while sitting on a chair. This is applicable also to the previously mentioned embodiment in which the scanning mirror runs above the original as far as the use of space available under the original table concerns.

In the apparatus according to the invention, said condensing means and photosensitive element in the second optical path are fixedly arranged with a certain definite distance therebetween and they are further fixed or moved together. Therefore, the distance therebetween always remains unchanged. This makes it possible to focus the original image on the photosensitive element with high accuracy.

Other and further objects, features and advantages of the invention will appear more fully from the following description taken in connection with the accompanying drawings.

BRIEF DESCRIPTION OF THE DRAWINGS

FIGS. 1A and 1B show the basic form of the apparatus according to the invention;

FIGS. 2 to 4 show modifications thereof;

DETAILED DESCRIPTION OF PREFERRED EMBODIMENTS

Figure 5:
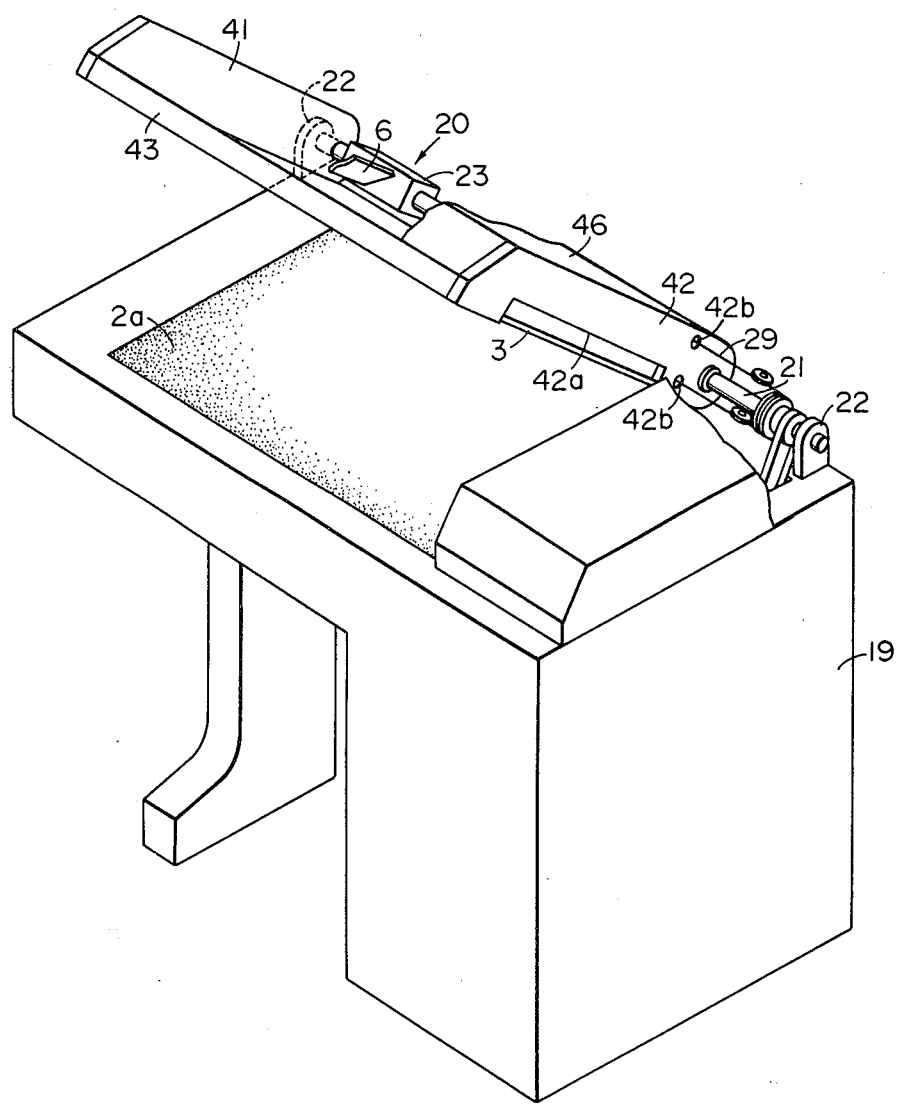
FIG. 5 is a perspective view of an embodiment of the invention based on the basic form shown in FIG. 1.

Referring first to FIGS. 1A and 1B showing the basic form of the invention, an original 1 is placed on an original table 2. Designated by 3 is a transparent plate such as glass plate for pressing the original. As original illuminating means there is provided a lamp 5 with a reflector 4. A first moving mirror 6 serves as the scanning mirror of the invention. An image of the original as obtained by illumination is directed to condensing means, a lens 10 through a stationary mirror 7 and second and third moving mirrors 8 and 9. The lens 10 focuses the original image on a sensor 11 which may be, for example, a CCD. The image focuses on the sensor 11 may be transmitted to other parts of the machine as an electric signal. Designated by 2a is a layer of cushion material which accommodates the original table 2 to a stack of originals overlaid successively or a heavy and bulky book original. The sensor 11 may be a conventional photosensitive medium. The term "photosensitive element" used herein should be understood to include the sensor and such photosensitive medium.

Scanning of the original is effected in the following manner:

The illumination lamp 5 with reflector 4 illuminates the original 1 through the transparent glass 3. While illuminating the original 1, the first moving mirror 6 moves in the direction of arrow A at a scanning speed of V. Synchronously with it, the second and third moving mirrors 8 and 9 together move in the direction of arrow B at a speed of ½V.

In this manner, optical scanning can be carried out while keeping original 1, lens 10 and sensor 11 stationary. This assures a high accuracy of the original image obtained at the sensor 11 and also brings forth the advantage of the small volume of space occupied by the peripheral part of original scanning path.

FIG. 2 shows a modification of the basic form shown in FIGS. 1A and 1B.

An original 1 is placed with its image side downward on an original table 3 made of transparent glass. An illumination lamp 5 with reflector 4 illuminates the original and a first moving mirror 6 scans it. Like that in FIG. 1, an image of the original is focused on a sensor 11 by a lens 10 through a stationary mirror 7 and the second and third moving mirrors 8 and 9. The second and third moving mirrors 8 and 9 are moved at ½ speed of the first moving mirror 6.

FIG. 3 shows another modification in which a conventional electrophotographic photosensitive medium in a shape of drum is used as the photosensitive element. In this case, the ratio of original image to image projected on the photosensitive drum is 1:1.

A scanning mirror 13 moves together with an illumination lamp 12 in the direction of arrow A to scan an original 15 under a transparent glass plate 14. The optical path of the scanned original image is turned by a stationary mirror 16 at a right angle toward a lens 17 and a photosensitive drum 18 on which the image of original is focused by the lens 17.

The lens 17 and photosensitive drum 18 are united together to form an assembly supported by a supporting member. When the scanning mirror 13 is moved in the direction of arrow A, the assembly of lens 17 and photosensitive drum 18 is moved in the direction of arrow B synchronously with the movement of the scanning mirror 13.

FIG. 4 shows a further modification of the basic form according to the invention. In this modification, the ratio of original image and image projected on a photosensitive drum 17 is reduced. Further, the angle which the optical path of the lens forms with the scanning optical path is not a right angle but an obtuse angle. The angle may be an acute angle. In this manner, within the scope of the invention, the optical path can be bent at an angle (somewhat obtuse or acute) other than a right angle relative to the scanning direction.

As will be understood from the foregoing, according to the invention, a first optical path is formed between the mirror 6 or 13 for scanning the Original 1 and the stationary mirror 7 or 16 and a second optical path is formed by the stationary mirror 7 or 16, lens 10 or 17 and photosensitive element 11 or 18 disposed in the focal plane of the lens. The first and second optical paths are so arranged as to describe an L shaped path approximately. This eliminates the disadvantages involved in the prior art system in which the optical path is provided under the scanning member. Moreover, according to the invention, mirrors of very small size can be used which serves to reduce the overall size of the apparatus. For the conventional system using large mirrors, location of the mirrors was limited by the arrangement of other mechanism to a great extent and therefore the overall size of the apparatus inevitably became large.

Now, concrete embodiments of the invention will be described wit reference to FIGS. 5–12. The embodiment shown in FIGS. 5–7 is based on the basic form of FIGS. 1A and 1B but it should be understood that modifications shown in FIGS. 2 to 4 are applicable to the concrete example in the manner described above.

In FIG. 5, the copying machine stand 19 provided with the apparatus according to the invention is in the form of desk and is shown in the position opened for placing or exchanging originals. Namely, the transparent original pressing plate 3 with a scanner 20 is in the position rotated upward about a scanner guide rail 2. A pair of supporting members 22, 22 support the guide rail 21 on the desk in parallel with the surface thereof.

Slidably movable along the guide rail 21 is a slider 23 carrying thereon the scanner 20 comprising an illumination lamp 5, reflector 4 and scanning mirror 6. As seen best in FIG. 7, the scanner 20 has a roller 24 at its end on the opposite side to the slider. The roller 24 is in contact with the upper surface of the transparent plate 3 so as to keep the scanner 20 parallel with the original and also to help it in running smoothly along the guide rail.

Figure 6:
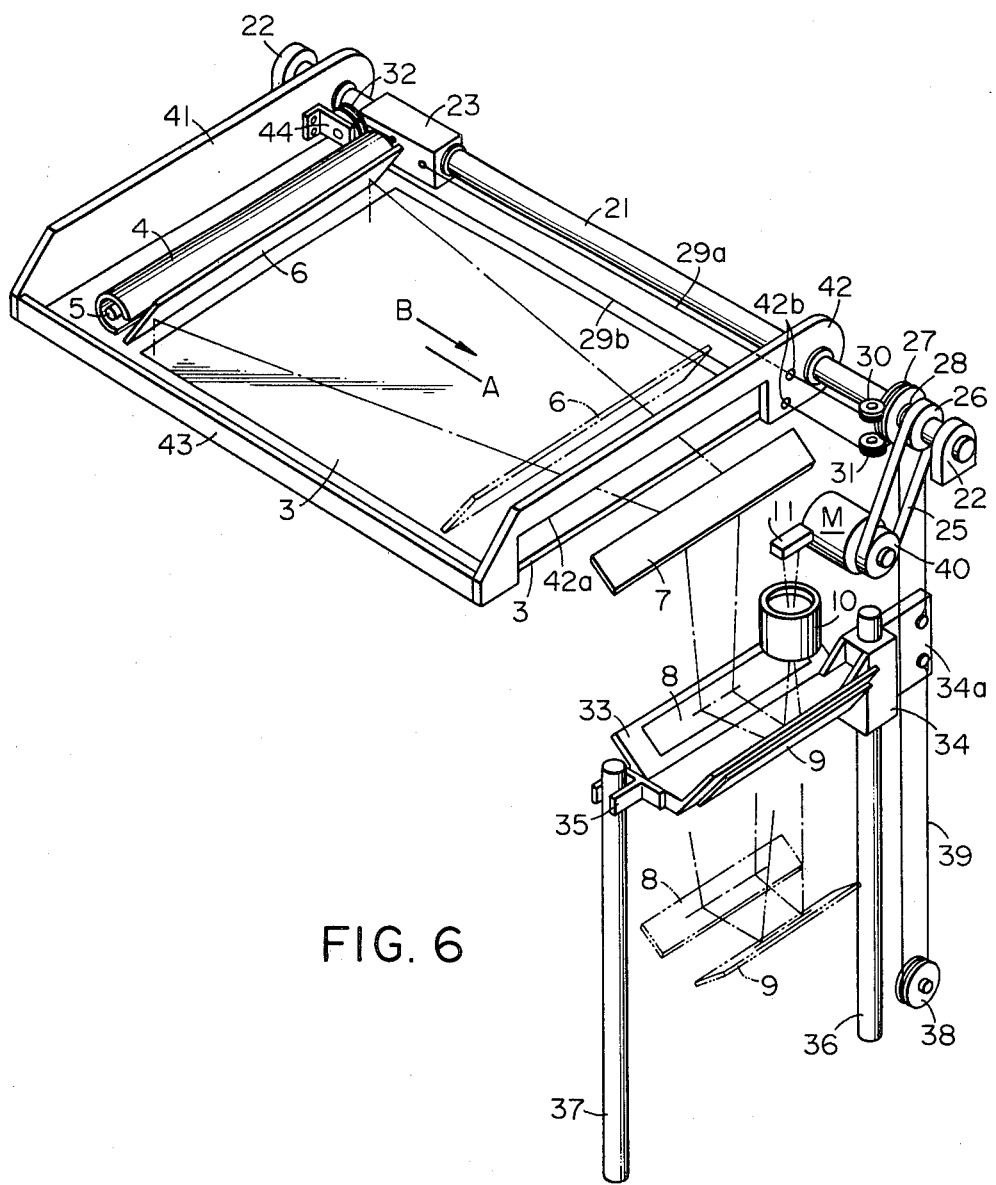
FIG. 6 is a perspective view of the essential part thereof including the first and second optical paths and driving mechanism.
Figure 7:
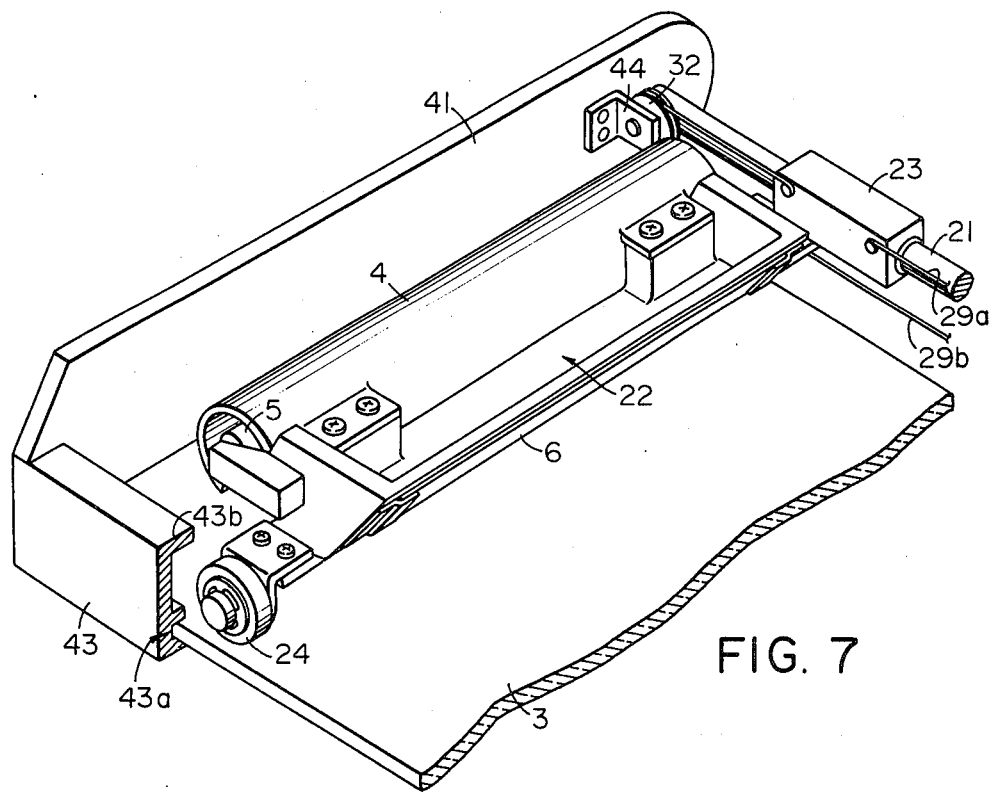
FIGS. 7 and 8 are partial perspective views thereof.

In FIG. 6, reference symbol M designates a driving motor for driving the scanner and 25 is a timing belt. 26 is a pulley, 27 is wire drum for driving the scanner and 28 is wire pulley for driving the moving mirrors 8 and 9 in the second optical path. The wire pulley 28 is so measured to have a diameter equal to $\frac{1}{2}$ of the diameter of drum 27. These members 26, 27 and 28 are united together to form a unitary member which is loose fitted on the guide rail 21 rotatably but unmovably in the axial direction. The wire wound around the drum 27 several turns extends, at its one end 29a, to the slider 23 passing through a guide pulley 30 and is anchored to one end side of the slider. The other end 29b of the wire 29 passes through a guide pulley 31 and a return guide pulley 32 and is then fastened to the other side of the slider 23.

The moving mirrors 8 and 9 constituting a part of the second optical path are mounted on a mirror carrier 33 having sliders 34 and 35 which are movable along guide rods 36 and 37 respectively. The guide rods 36 and 37 extend in the direction normal to the scanner guide rail 21 and, in the shown embodiment, the mirror carrier 33 moves vertically up and down as viewed on the drawing. A wire 39 extends between the wire pulley 28 and a pulley 38 vertically and the two ends of the wire 39 are fastened to an arm 34a of the slider 34.

The lens 10, sensor 11 and stationary mirror 7 are fixedly mounted on the copying machine stand as stationary members. When the motor M is started rotating, the timing belt 25 rotates the pulley 26 and therefore the wire drum 27 and wire pulley 28. By wire 29, the scanner 20 is moved along the guide rail 21 in parallel with the original 3. On the other hand, by wire 39 the mirrors 8 and 9 in the second optical path are moved vertically along the guide rods 36 and 37 respectively from the position indicated by the solid line toward that suggested by the phantom line. The running speed of the scanning mirror at this time is V and that of the mirrors 8 and 9 is $\frac{1}{2}$V. Therefore, the optical path length between the original and lens is kept constant and remains unchanged irrespective of the movement of the scanning mirror 6.

Reciprocation of the scanner as well as of the mirrors 8 and 9 can be attained by using a reversible motor M or providing a reversing mechanism between a non-reversible motor M and pulley 40. Arrows A and B in FIG. 6 indicate the directions of the reciprocation. Let the direction B be the scanning direction by the scanner, then the mirrors 8 and 9 in the second optical path will read the image information of original while moving vertically downwardly. Since the wire drum 27 for driving the scanner and the wire drum 28 for driving the mirrors 8 and 9 are unitarily formed to hold an interlocked relation between the two drums, the motion of the latter assists the former. Therefore, it is unnecessary to use a large force for driving the scanner 20 in the scanning direction. This eliminates the problem of image vibration generally involved in the conventional horizontal moving type of scanning optical system. In this conventional type of optical system, a plural number of mirrors are moved in the horizontal direction to scan the original image and the mechanical oscillation of the optical mirrors and other elements at the start of scanning often causes a vibration of the original image. This problem is eliminated by the above arrangment in accordance with the invention. Furthermore, according to the invention, a smooth rising of the scanner 20 and mirror carrier 33 is assured at the time of start of scanning. Since there is no substantial inertial lag, it is no longer necessary to use particular breaking means. In addition, a long approach becomes unnecessary for each mirror and the length of approach can be shortened to a great extent as compared with the conventional apparatus. All of these advantages of the invention lead to a substantial reduction in size and weight of the apparatus.

In this manner, in respect to the scanning direction, the driving motion for scanning mirror 6 and that for moving mirrors 8 and 9 are interlocked with each other so that at the time of scanning of original image by the scanning mirror 6 the moving mirrors 8 and 9 are moved vertically from top to bottom. This arrangement eliminates the problems of inertial lag and image vibration at the time of start of scanning. Therefore, quality of image is also improved according to the invention.

In the shown embodiment, an original is placed on the original table 2 with its image side upward. Mechanism for opening and closing the transparent plate 3 including the scanning mirror 6 relative to the original will be described in detail hereinafter.

The original pressing plate 3 is rotatable about the guide rail 21 between its opened position and closed position. To this end, two side plates 41 and 42 are loose-fitted on the guide rail 21 with a sufficient distance therebetween to allow the scanner 20 to scan the original. The two side plates 41 and 42 are connected together by a front frame plate 43 at the side opposite to the guide rail. As shown in FIG. 7, these plates have a U-shaped portion 43a for receiving the transparent plate 3. The front frame plate 43 has further a guide projection 43b provided at a level not to contact with the roller 24 at the one end of the scanner 20 during scanning. During scanning the transparent plate 3 is in its closed position shown in FIGS. 6 and 7 relative to the original and the roller 24 keeps the distance between the original and scanning mirror 6 constant. The roller 24 can run on the transparent plate 3 to carry out scanning the original.

In the opened position of the transparent plate 3 shown in FIG. 5, the roller 24 is apart from the plate 3 because the scanner 20 is rotatable about the guide rail 21. However, the turning movement of the roller away from the transparent plate 3 is limited by the above mentioned guide projection 43b. When the roller 24 moves away from the surface of the transparent plate 3 at the time of the latter being opened, the top of the roller comes into contact with the guide projection 43b which prevents the roller from moving too far away from the transparent plate 3. Preferably, the guide projection 43b extends over the full length of the plate in the scanning direction. By doing so, excessive turning movement of the roller 24 about the guide rail 21 can be prevented no matter where the scanning mirror 6 is stopped.

Figure 8:
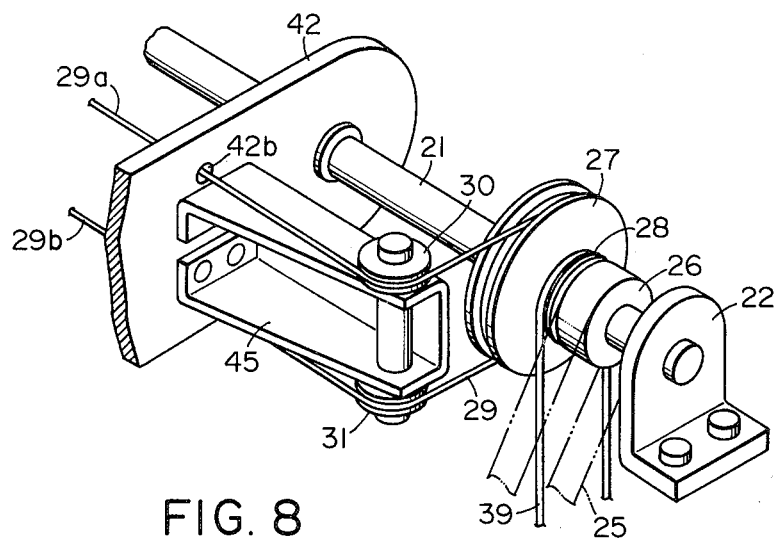

As shown in FIGS. 7 and 8, guide pulleys 30, 31 and 32 for the scanner driving wire 29 are supported by the side plates 41 and 42 through brackets 44 and 45 so as to allow the transparent plate 3 and the scanner 20 to be opened and closed about the guide rail 21. In FIG. 6, the reference numeral 42a designates an opening provided in the side plate 42 to lead the scanning light to the stationary mirror 7. Designated by 42b are openings provided in the side plate 42 through which the wire 29 passes. A cover member 46 covering the top portions of the side plates 41, 42 and front frame plate 43 is so disposed as not to interfere with the running of the scanning mirror 6.

Figure 9:
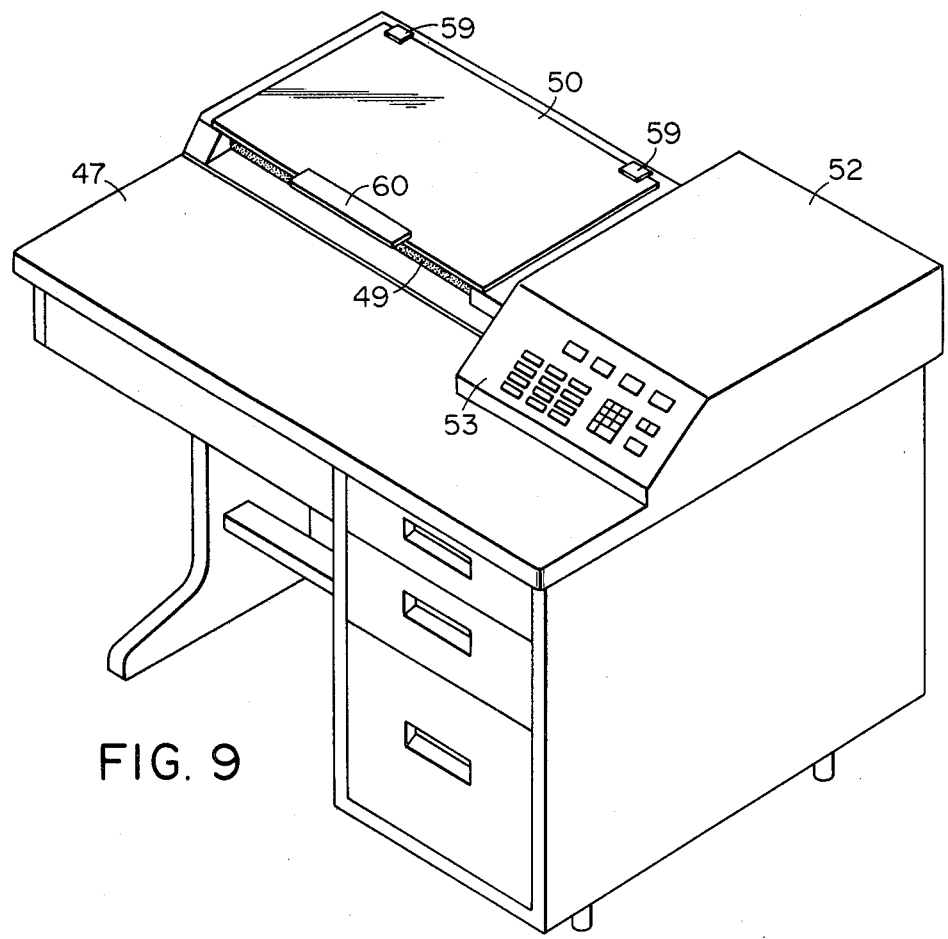
FIG. 9 shows another embodiment of the invention.
Figure 10:
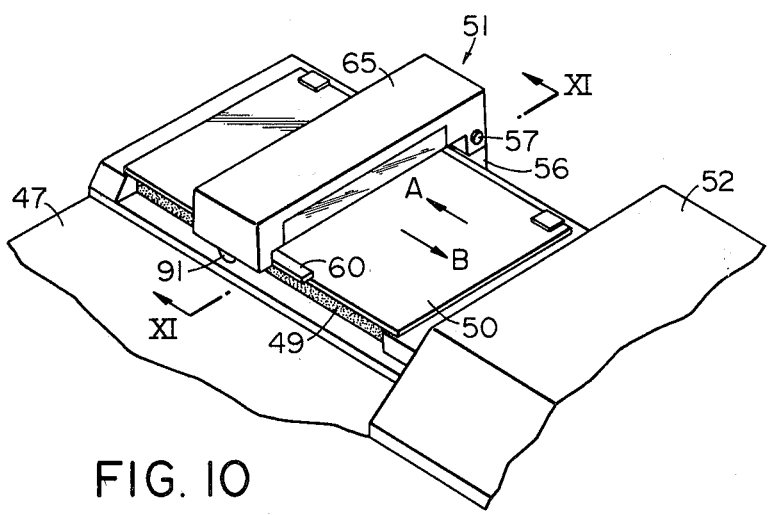
FIG. 10 is a partial perspective view thereof showing the manner of scanning.

Another embodiment of the present invention is shown in FIG. 9. In the embodiment, the apparatus of the invention is set on a desk 47. An original 54 is placed on an original table 48 with its image side upward. As seen best in FIG. 11, the original table 48 has a layer of cushion material 49. The original 54 on the cushion layer 49 is pressed flat against the cushion layer by a transparent plate 50 which may be a glass plate. A scanner 51 is disposed across the original table 48 as shown in FIG. 10. At one side of the original table, that is, at the right-hand side thereof as viewed on the drawing of FIG. 10 there is provided a hangar 52 for the scanner 51. The scanner is, when not in use, housed in the hangar. When copying operation is to be started, the operator puts in an operation signal from the operation panel 53 provided on the hangar 52 (FIG. 9). In response to the signal, the scanner 51 comes out from the hangar and starts moving in the direction of arrow A in FIG. 10 to carry out optical scanning of the original 54 lying under the transparent plate 50.

The running distance of the scanner in the direction A is determined by an original size signal from the operation panel 53. When the scanner has just moved the instructed distance and the scanning is completed, the moving direction of the scanner 51 is automatically reversed to B. The scanner is returned back in the direction of arrow B to a predetermined position in the hangar 52 and stopped at the position shown in FIG. 9. The hangar 52 may be omitted and instead only an open space having a width at least equal to the width of the scanner 51 may be provided at the stop position of the latter. In this case, the operation panel 53 may be placed at another suitable place, for example, on the desk 47.

Figure 11:
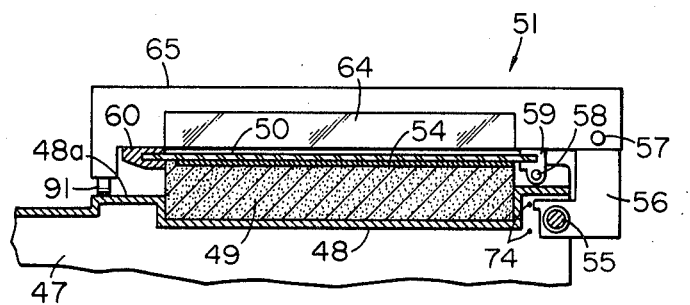
FIG. 11 is a cross-sectional view taken along the line XI—XI in FIG. 10.

FIG. 11 is a cross sectional view taken along the line XI—XI in FIG. 10. The original table 48 is formed to comprise the layer of cushion material 49 on the desk 47. The cushion material accommodates the original table not only to a sheet original but also to a book original to be copied. In FIG. 11, the reference numeral 55 designates a guide rail for the reciprocation of the scanner, 56 is a slider, 57 is a pivot about which the scanner 51 is turnable relative to the sliders 56, and 58 is also a pivot about which the transparent plate 50 can be opened and closed relative to the desk 47. 59 is a bearing of the pivot 58, and 60 is a grip.

With the above arrangement, the transparent plate 50 can be opened and closed at one's will relative to the original after the scanner 51 is moved back to its home position in the hangar. Since the original is placed on the original table with its image side upward, many advantages as previously mentioned can be obtained in editing and other works. Misalignment of the original to the original table or creased position of the original, if any, is easily notable through the transparent plate 50. Therefore, the operator can correct it in a simple manner before start of copying. Also, a number of sheet originals can be placed successively on the original table one on another. This is very convenient to the operator.

Figure 12:
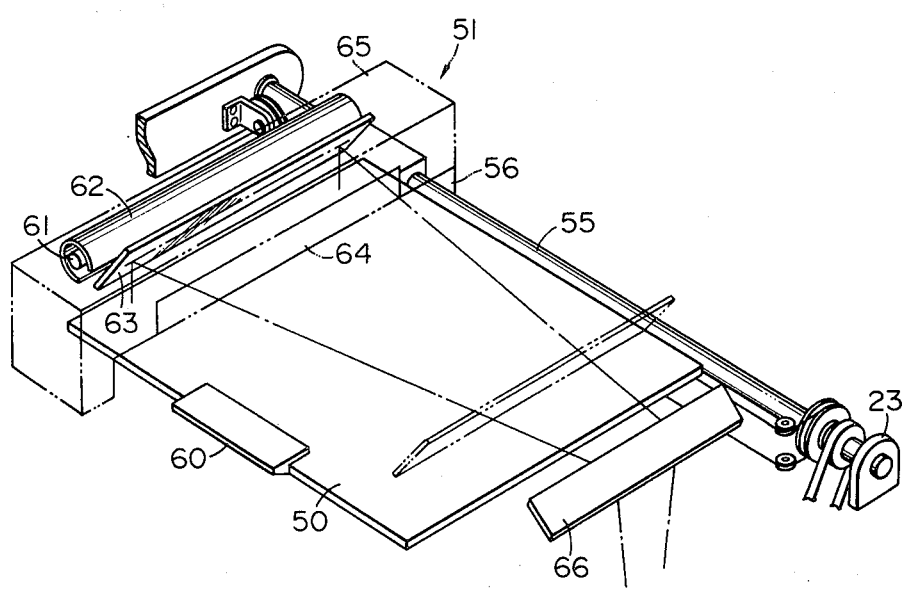
FIG. 12 is a partial perspective view thereof.
Figure 13:
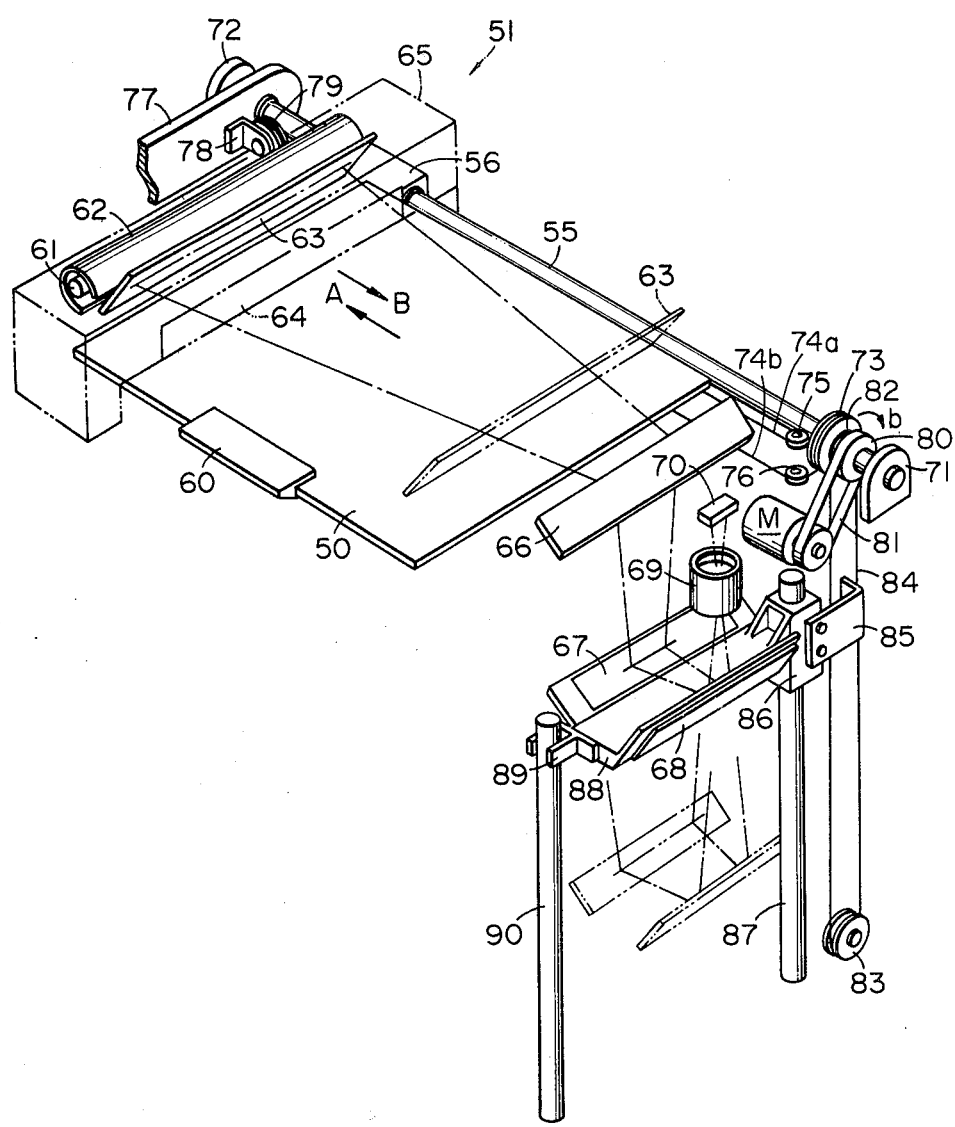
FIG. 13 shows a further embodiment of the invention in a perspective view of the mechanism within the apparatus.

The structure and manner of operation of the scanner 51 will readily be seen from FIGS. 12 and 13.

As shown in detail in FIG. 12, the scanner 51 is encased in a cover member 65 and comprises an illumination lamp 61, a reflector 62, a scanning mirror 63 and a transparent side plate 64. In scanning, the lamp 61 illuminates the original 54 lying under the transparent plate 50. The reflected image from the original is directed toward the hangar 52 by the scanning mirror 63. In the hangar there is provided a stationary mirror 66. The scanning mirror 63 runs in parallel with the surface of the transparent plate 50 and reflects the original image upon the stationary mirror 66. The stationary mirror 66 reflects the original image vertically downwardly toward a mirror 67. As shown in FIG. 13, the mirror 67 reflects the original image to a mirror 68 which reflects it again vertically upwardly toward a lens 69 fixed to the body of apparatus. Through the lens 69, the original image is focused on a sensor 70 which is a solid image pickup element such as a CCD mentioned above. The sensor produces a photo-electrically transduced electric signal which is introduced into other equipment or a device to develope the image.

The scanner 51 and mirrors 67 and 68 are driven in the following manner:

Supports 71 and 72 for guide rail 55 are fixed onto the desk 47. The slider 56 carrying thereon the scanner 51 is fitted on the rail 55 through a bearing. Also, on the guide rail 55 a wire drum 73 is mounted rotatably but unmovably in the axial direction of the rail. A wire 74 is wound around the drum 73. One end 74a of the wire 74a passes through a guide pulley 75 and then it is anchored to the slider 56. Another end 74b of the wire 74 is fastened to another side of the slider 56 after passing around a guide pulley 76 and returning back around a guide pulley 79 supported on a supporting plate 77 through a bracket 78. The supporting plate 77 is fixed to the body of apparatus.

A pulley 80 formed unitary with the above wire drum 73 is driven into rotation by a motor M through a suitable transmission member such as a timing belt 81. When the pulley 80 is driven rotating in the direction of arrow b in FIG. 13, the scanner 51 is moved in the direction of arrow B. If the pulley is rotated in the opposite direction to arrow b, then the scanner is moved in the direction of arrow A. The scanner is moved at a speed of V. Since the optical path length between the original and the lens 69 must be kept constant irrespective of the movement of the scanning mirror 63, the mirrors 67 and 68 are moved at a speed of ½V. To this end, a pulley 82 is provided which is formed unitarily with the pulley 80 and measured to have a diameter equal to ½ of that of the wire drum 73. At a position under and opposed to the pulley 82 there is provided a lower pulley 83 with a wire 84 extending between the pulleys 82 and 83. Two ends of the wire 84 are anchored to a mounting plate 85 on which a slider 86 is fixedly mounted. The slider 86 is slide movable along a vertical rod 87 up and down. A carrier 88 carrying thereon the mirrors 67 and 68 is connected with the slider 86 at its one end. At the other end, the mirror carrier has a slide block 89 in slide engagement with another vertical guide rod 90 extending in parallel with the guide rod 87. Thus, when the mounting plate 85 is moved up and down together with the slider 86 by the wire 84, the mirror carrier 88 is slide moved along the guide rods 87 and 90 up and down vertically. Since the speed of mirrors 67 and 68 on the mirror carrier moving in this manner is ½ of the running speed of the scanning mirror 63, the above-mentioned optical path length can be kept constant.

As described above, the scanner 51 is driven while its one end is guided and supported by the guide rail 55. At the other end, the scanner 51 has a roller 91 which can run on a flat surface part 48a extending along the original table 48 during scanning. The roller keeps the distance between the scanning mirror 64 and the original 54 constant. This roller 91 in this embodiment corresponds to the roller 24 in FIG. 7 embodiment. When an original is placed on the cushion material 49 of the original table, the thickness of the original is absorbed by the cushion material 49 owing to the weight of the transparent plate 50 applied thereto so long as the original is a common sheet original or an original not so thick as a book. Therefore, the transparent plate 50 can hold its flat position during scanning of the original. However, in case that the original is a book or other thick original, the thickness of the original can not be absorbed by the cushion material 49. In such a case it is advisable that the transparent plate be pressed down against the elasticity of the cushion material and, when it gets flat, the transparent plate be locked in the flat position using a hook or the like. Such locking mechanism is applicable also to the embodiment shown in FIG. 5.

As is well understood from the foregoing, in the scanning apparatus according to the invention, an image of an original obtained by scanning the original is turned to the direction nearly normal to the scanning direction and focused on a photosensitive element after running along a L-shaped optical path. With this arrangement, only a scanning mirror is required to run above or under the original for scanning. Therefore, it is possible to provide scanning means above the original table and said scanning means can be opened and closed relative to the original. Even when the scanning mirror is provided under the original, the space required for scanning is only a space for movement of the scanning mirror. Therefore, in either case, the space required for scanning of originals can be minimized and a large free space can be obtained under the original table. Making use of this available space, the original table can be formed as a desk type one.

As previously described a, CCD element can be used as a sensor to obtain a copy of the original image. In this case, the output signal from the sensor is introduced into an image forming part through a lead wire or the like. Process for forming images using such a CCD element is known in the art. For example, a typical example of such process is disclosed in U.S. Pat. No. 4,094,606. Image formation a CCD element need not be further described.

While the invention has been particularly shown and described with reference to preferred embodiments thereof, it will be understood by those skilled in the art that the foregoing and other changes in form and details can be made therein without departing from the spirit and scope of the invention.

What we claim is:

1. An original image projecting apparatus of the type in which an original is scanned and an image of the original is projected onto a photosensitive element, said apparatus comprising:

original supporting means for supporting an original thereon with a surface to be scanned of the original facing upwardly;

a scanning mirror for scanning the surface of the original;

a transparent plate for holding the original on said original supporting means and engageable on the surface of the original;

guide means for supporting one end of said scanning mirror, said guide means mounting said scanning mirror for movement in a scanning direction and for pivoted movement toward and away from an original supported on said original supporting means; and means for focusing the image of an original on the photosensitive element.

2. An apparatus according to claim 1, wherein one end of said scanning mirror is supported by said guide means, and further comprising a roller provided at the other end of said scanning mirror.

3. An original image projecting apparatus of the type in which an original is scanned and an image of the original is projected onto a photosensitive element, said apparatus comprising:

original supporting means for supporting an original thereon;

means for illuminating a surface of the original;

a scanning mirror movable in a scanning direction for scanning the surface of the original and for directing the illuminated image of the original in a direction substantially parallel to the scanning direction;

stationary reflecting means for reflecting the image, directed from said scanning mirror, in a predetermined direction;

condensing means for receiving the image of the original and for focusing the image on said photosensitive element; and means for moving said condensing means and said photosensitive element during scanning of the original, to maintain the length of a first optical path between the surface of the original and said condensing means constant during scanning of the original and for maintaining the length of a second optical path between said condensing means and said photosensitive element constant during scanning of the original.

4. An original image projecting apparatus of the type in which an original is scanned and an image of the original is projected onto a photosensitive element, said apparatus comprising:

original supporting means for supporting the original thereon;

means for illuminating a surface of the original;

a scanning mirror movable in a scanning direction for scanning the surface of the original and for directing the image of the original in a direction substantially parallel to the scanning direction;

stationary reflecting means for reflecting the image, directed from said scanning mirror, in a direction substantially normal to the scanning direction;

condensing means for receiving the image of the original and for focusing the image on said photosensitive element; and means for maintaining the length of a first optical path between the surface of the original and said condensing means constant during scanning of the original and for maintaining the length of a second optical path between said condensing means and said photosensitive element constant during scanning of the original, wherein the lengths of said first optical path and said second optical path are kept constant by said maintaining means by moving said condensing means and said photosensitive element a distance equal to the distance which said scanning mirror moves during scanning of the original.

5. An apparatus according to claim 4, wherein said condensing means is mounted for movement upwardly and downwardly.

6. An apparatus according to claim 4, further comprising holding means having a transparent plate for holding the original on said original supporting means, said scanning mirror being mounted for scanning movement above and along said transparent plate, whereby the original may be placed on said original supporting means with said surface facing upwardly to be scanned.

7. An original image projecting apparatus of the type in which an original is scanned and an image of the original is projected onto a photosensitive element, said apparatus comprising:

original supporting means for supporting the original thereon;

means for illuminating a surface of the original;

a scanning mirror movable in a scanning direction for scanning the surface of the original and for directing the image of the original in a direction substantially parallel to the scanning direction;

stationary reflecting means for reflecting the image, directed from said scanning mirror, in a direction substantially normal to the scanning direction;

condensing means for receiving the image of the original and for focusing the image on said photosensitive element; and means for maintaining the length of a first optical path between the surface of the original and said condensing means constant during scanning of the original and for maintaining the length of a second optical path between said condensing means and said photosensitive element constant during scanning of the original, wherein the lengths of said first optical path and said second optical path are kept constant by said maintaining means which comprises movable reflecting means provided optically between said stationary reflecting means and said condensing means, and means for moving said movable reflecting means to maintain the length of the first optical path constant during scanning of the original.

8. An apparatus according to claim 7, wherein said movable reflecting means is mounted for movement upwardly and downwardly.

9. An apparatus according to claim 7, further comprising holding means having a transparent plate for holding the original on said original supporting means, said scanning mirror being mounted for scanning movement above and along said transparent plate, whereby the original may be placed on said original supporting means with said surface facing upwardly to be scanned.

10. An original image projecting apparatus of the type in which an original is scanned and an image of the original is projected onto a photosensitive element, said apparatus comprising:

original supporting means for supporting the original thereon;

means for illuminating a surface of the original;

a scanning mirror movable in a scanning direction for scanning the surface of the original and for directing the image of the original in a direction substantially parallel to the scanning direction;

stationary reflecting means for reflecting the image, directed from said scanning mirror, in a direction substantially normal to the scanning direction;

condensing means for receiving the image of the original and for focusing the image on said photosensitive element;

means for maintaining the length of a first optical path between the surface of the original and said condensing means constant during scanning of the original and for maintaining the length of a second optical path between said condensing means and said photosensitive element constant during scanning of the original; and holding means having a transparent plate for holding the original on said original supporting means, said scanning mirror being mounted for scanning movement above and along said transparent plate, whereby the original may be placed on said original supporting means with said surface facing upwardly to be scanned.

11. An apparatus according to any one of claims 10, 6 and 9, further comprising guide means for supporting one end of said scanning mirror with the other end of said scanning mirror being free, said guide means mounting said scanning mirror for movement in the scanning direction and for pivoted movement toward and away from an original supported on said original supporting means.

12. An apparatus according to claim 10, 6 and 9, further comprising guide means for supporting one end of said scanning mirror for movement in the scanning direction; and a roller for supporting the other end of the scanning mirror for movement in the scanning direction to scan the original, said roller riding on said holding means.

13. An apparatus according to any one of claims 10, 6 and 9, further comprising guide means for supporting said scanning mirror for movement in the scanning direction and for mounting said scanning mirror and said holding means for pivoted movement toward and away from the original supported on said original supporting means.

14. An original image projecting apparatus of the type in which an original is scanned and an image of the original is projected onto a photosensitive element, said apparatus comprising:

original supporting means for supporting the original thereon with a surface to be scanned of the original facing upwardly;

means for illuminating the surface of the original;

a scanning mirror arranged above the original supporting means and movable in a scanning direction for scanning the surface of the original and for directing the image of the original in a direction substantially parallel to the scanning direction;

stationary reflecting means for reflecting the image, directed from said scanning mirror, in a predetermined direction;

condensing means for receiving the image of the original and for focusing the image on said photosensitive element; and movable reflecting means provided optically between said stationary reflecting means and said condensing means, said movable reflecting means moving during scanning of the original to maintain the length of a optical path between the surface of the original and the condensing means constant.

* * * * *

UNITED STATES PATENT AND TRADEMARK OFFICE
CERTIFICATE OF CORRECTION

PATENT NO. : 4,421,403
DATED : December 20, 1983
INVENTOR(S) : TADASHI SATO, ET AL.

It is certified that error appears in the above-identified patent and that said Letters Patent is hereby corrected as shown below:

COLUMN 5

Line 5, "of other mechanism" should read --of the other mechanisms--.

Line 9, "wit" should read --with--.

Line 16, insert --a-- before "desk".

Line 33, insert --a-- before "wire".

Line 34, insert --a-- before "wire".

COLUMN 6

Line 32, "breaking" should read --braking--.

COLUMN 8

Line 5, "sliders 56" should read --slider 56--.

Line 40, insert --the-- before "apparatus".

Line 53, "74a" (second occurrence) should read --74--.

Line 60, insert --the-- before "apparatus".

COLUMN 9

Line 12, "slide" should read --slidably--.

Line 20, "is slide moved" should read --slides--.

UNITED STATES PATENT AND TRADEMARK OFFICE
CERTIFICATE OF CORRECTION

PATENT NO. : 4,421,403  Page 2 of 2

DATED : December 20, 1983

INVENTOR(S) : TADASHI SATO, ET AL.

It is certified that error appears in the above-identified patent and that said Letters Patent is hereby corrected as shown below:

COLUMN 10

Line 1, "described a," should read --described, a--.

CLAIM 12

Line 1, delete "claim" and insert --any one of claims--.

CLAIM 14

Line 24, "a optical" should read --an optical--.

Signed and Sealed this

Twenty-fourth Day of July 1984

[SEAL]

Attest:

GERALD J. MOSSINGHOFF

*Attesting Officer*   *Commissioner of Patents and Trademarks*